Patented Oct. 9, 1951

2,570,502

UNITED STATES PATENT OFFICE 2,570,502

PREPARATION OF SALICYLAMIDE

William R. Surine, Midland, Mich., assignor to The Dow Chemical Company, Midland, Mich., a corporation of Delaware No Drawing. Application August 26, 1949, Serial No. 112,639

8 Claims. (Cl. 260—559)

This invention concerns an improved process for making salicylamide by reaction of a lower alkyl ester of salicylic acid with ammonia. It relates more particularly to a procedure for making salicylamide by reacting methyl salicylate with ammonia at superatmospheric pressure while in admixture with an aqueous solution containing a reducing agent.

It is known to prepare salicylamide by treating methyl salicylate with a concentrated aqueous solution of ammonia. The procedure, while suitable for preparing salicylamide in the laboratory, is not entirely satisfactory and has certain disadvantages, particularly when applied to the production of salicylamide in large quantities, e. g. in amounts of 50 pounds or more.

The salicylamide product prepared by treating methyl salicylate with a concentrated aqueous solution of ammonia is frequently obtained as crystals having a gray, or pink color, which renders the salicylamide unsuitable as a chemical compound of pharmaceutical grade. Recrystallization of the salicylamide from a solvent has been ineffective to remove the color so as to produce a white crystalline powder acceptable to the trade.

It is therefore a primary object of the invention to provide a process for making salicylamide of high purity and good color, i. e. white or nearly white crystals, by reaction of methyl salicylate with ammonia in an aqueous medium. Another object is to react methyl salicylate with ammonia at superatmospheric pressure in admixture with an aqueous solution containing a reducing agent. A further object is to provide a process for making salicylamide from methyl salicylate and ammonia by direct and simple procedure. Other and related objects will become apparent from the following description of the invention.

According to the invention, salicylamide of high purity and good color can be prepared by reacting methyl salicylate with ammonia at superatmospheric pressure while in admixture with an aqueous reaction medium containing a reducing agent. The salicylamide can be recovered from the reaction mixture in good yield by distilling the ammonia and by-product alcohol from the mixture, treating the residue with a solvent, e. g. water or ethyl alcohol, and separating the salicylamide by crystallization.

It is important that the reaction be completed in a brief period of time in order to reduce the tendency toward the formation of a discolored salicylamide product. In this connection it may be mentioned that the salicylamide product is usually of less attractive color when the reaction is carried out at a temperature of about 90° C., or higher, than when the reaction is carried out at a lower temperature, e. g. at a temperature of 60° C., or less. The salicylamide product is also of undesirable color when the reaction mixture is heated at such lower temperatures for prolonged periods of time.

By maintaining the methyl salicylate in admixture with the aqueous reaction medium under a positive superatmospheric pressure of ammonia gas, the reaction of the methyl salicylate with ammonia is not only caused to proceed at a greatly accelerated rate, but the reaction can readily be carried out to produce salicylamide in good yield, employing lesser amounts of water as reaction medium than when a concentrated aqueous solution of ammonia is used alone. Dissolving a small amount, e. g. from 0.2 to 2 per cent by weight, of an inorganic reducing agent in the aqueous reaction medium, effectively suppresses the tendency toward the formation of undesirable color in the salicylamide product for a time sufficient to complete the reaction so that salicylamide of good color and high purity can readily be recovered from the reaction mixture.

The ammonia is employed in excess of the methyl salicylate used in the reaction and in amount sufficient to provide a positive superatmospheric pressure of ammonia gas in contact with the reaction mixture during the reaction period. The water may be used in any desired proportions, but is preferably employed in amounts corresponding to from 0.5 to 1.5 parts by weight per part of the methyl salicylate used. The water may be replaced in whole, or in part, by an aqueous solution of ammonia.

The water-soluble inorganic reducing agents to be employed in the reaction are preferably ammonium sulfite or ammonium thiosulfate, but the sulfites and the thiosulfates of the alkali metals such as sodium sulfite, potassium sulfite, sodium thiosulfate and potassium thiosulfate may also be used. The inorganic reducing agent is usually employed in amounts corresponding to from 0.2 to 5 per cent, preferably from 0.2 to 1 per cent, by weight of the methyl salicylate used in the reaction, although somewhat larger amounts of the reducing agent may be used.

The reaction, which occurs readily at room temperature, or thereabout, and at superatmospheric pressures of from 5 to 100 pounds per square inch gauge pressure, is usually carried out at a superatmospheric pressure of from 5 to 50 pounds, preferably from 10 to 30 pounds, gauge pressure, and at temperatures between 30° and 70° C., but a reaction temperature of from 35° to 60° C. is preferred.

In practice the methyl salicylate, the water, or an aqueous solution of ammonia, and the inorganic reducing agent, preferably ammonium sulfite, are mixed together in the desired proportions in a pressure resistant vessel which has been flushed with nitrogen, or ammonia gas, to remove air. The mixture is agitated and warmed to a temperature of about 35° C. Ammonia gas is then fed to the reaction until a superatmospheric pressure of approximately 10 pounds is obtained. Thereafter, the reaction mixture is maintained at a temperature between 35° and 60° C. and in contact with ammonia gas at a pressure of from 10 to 30 pounds per square inch, gauge, until the reaction is substantially complete, or until ammonia is no longer absorbed in the mixture. Thereafter, the pressure is released and ammonia, methanol formed in the reaction, and water are separated from the salicylamide product. The ammonia, methanol and water may be distilled from the reaction mixture by gradually heating the same to a temperature between 105° and 140° C. at atmospheric pressure, or by heating the reaction mixture to a lower temperature in vacuum. The residue is preferably dissolved in boiling water, filtered while hot to remove solid impurities, cooled to crystallize the salicylamide and the crystals separated by filtering, washed with water and dried. The residue may be dissolved in an organic solvent, e. g. ethanol or isopropanol, and the salicylamide recovered by crystallization.

Activated charcoal such as Darco, or Norit, or other decolorizing, or clarifying agents, e. g. the tetra sodium salt of ethylene diamine tetra acetic acid, may advantageously be mixed with the hot aqueous solution of the salicylamide prior to filtering the same. In this connection, it may be mentioned that the tetra sodium salt of ethylene diamine tetra acetic acid is particularly effective to remove traces of heavy metals, e. g. iron or nickel.

The following examples illustrate practice of the invention, but are not to be construed as limiting the scope thereof.

*Example 1*

A charge of 200 grams (1.3 moles) of methyl salicylate and 2 grams of ammonium sulfite, $(NH_4)_2SO_3 \cdot H_2O$, together with 200 grams of distilled water was placed in a one liter nickel pressure resistant vessel equipped with valved inlets, a pressure gauge and a stirrer. The mixture was stirred and the vessel was flushed with ammonia gas to remove air therefrom. Ammonia gas was then fed to the reaction at 15 pounds per square inch gauge pressure, over a period of 6 hours. The temperature of the reaction mixture rapidly increased to 56.5° C. over a period of 15 minutes, then cooled slowly to 40.5° C., at the end of the reaction period. After release of the pressure, the reaction mixture, a clear yellow solution, was transferred to a glass distilling flask and was concentrated by distilling off ammonia, methanol formed in the reaction, and most of the water by gradually heating the residue to a temperature of about 120° C. The residue consisting of a yellow crystalline solid was dissolved in 1 liter of boiling water and the solution cooled to room temperature to crystallize the salicylamide therefrom. The crystals were filtered off, washed with water and dried in an oven at a temperature of 80° C.

There was obtained 164 grams of white crystals melting at 139°–141° C. The yield of salicylamide was 91 per cent of theoretical.

*Example 2*

A charge of 300 grams (1.97 moles) of methyl salicylate and 3 grams of sodium thiosulfate, $Na_2S_2O_3 \cdot 5H_2O$, together with 200 grams of distilled water was placed in a nickel autoclave and reacted with ammonia gas as described in Example 1. The reaction mixture was distilled to remove ammonia, methanol and water. The residue was dissolved in 1 liter of boiling water containing 10 ml. of an aqueous 30 weight per cent solution of the tetra sodium salt of ethylene diamine tetra acetic acid and the solution cooled to room temperature. The crystalline salicylamide product was recovered by filtering, washed with water and dried. There was obtained 236.6 grams of nearly white crystals. The yield of salicylamide was 87.8 per cent. 50 grams of the salicylamide was dissolved in 400 ml. of boiling water containing 10 ml. of an aqueous 30 weight per cent solution of the tetra sodium salt of ethylene diamine tetra acetic acid and 1 gram of Norit, an active decolorizing charcoal. The hot solution was filtered, cooled to room temperature to crystallize the salicylamide and again filtered and the crystals washed with water and dried. The crystals were snow white and had a melting point of 140°–141° C.

*Example 3*

A mixture consisting of 100 pounds (0.66 mole) of methyl salicylate, 200 pounds of an aqueous 28 weight per cent ammonium hydroxide solution and 0.5 pound of ammonium sulfite, $(NH_4)_2SO_3 \cdot H_2O$

was placed in a closed 100 gallon stainless steel vessel equipped with valved inlets, a goose neck and condenser, and a stirrer. The mixture was stirred and heated to a temperature of 35° C., whereupon the heat of reaction raised the temperature of the reaction mixture to 45° C. over a period of about 15 minutes. After dissipation of the initial heat of reaction, the temperature of the mixture was raised to 60° C. over a period of about 15 minutes longer. The pressure in the vessel increased to 19 pounds per square inch, gauge pressure, and then decreased to 5 pounds. Ammonia gas was then fed into the vessel and the pressure maintained at 10 pounds for the rest of the reaction period. The reaction time, i. e. the total time of heating the reaction mixture at temperatures between 35° and 60° C. in contact with ammonia under pressure was 4 hours. Thereafter, the pressure was released and the reaction mixture was heated at atmospheric pressure to distill therefrom ammonia, methanol and most of the water by heating the residue to a temperature of 105° C. The residue was dissolved in a solution consisting of 75 gallons of water and 1.32 pounds of an aqueous 30 weight per cent solution of the tetra sodium salt of ethylene diamine tetra acetic acid, by heating the same therewith to a temperature of 100° C., over a period of 1 hour with stirring. Three pounds of Darco, a decolorizing charcoal, was dispersed in the solution. The hot solution was filtered and cooled to 18° C. to crystallize the salicylamide. The crystals were then separated by filtering, washed with water and dried. There was obtained 79.5 pounds (0.58 mole) of salicylamide, as snow white crystals melting at 140°–141.8° C. The yield was 88 per cent of theoretical. The crystals on analysis were found to be 99.8 per cent pure salicylamide.

Other modes of applying the principle of the invention may be employed instead of those explained, change being made as regards the step or steps herein described, provided the step or steps stated in any of the following claims, or the equivalent of such stated step or steps be employed.

I claim:

1. In a process wherein an aqueous ammonia solution is reacted with a lower alkyl ester of salicylic acid to form salicylamide, the improvement which consists in carrying the reaction out at a temperature between 30° and 70° C. in contact with gaseous ammonia at greater than atmospheric pressure while in admixture with from 0.5 to 1.5 parts by weight of water per part of the ester and from 0.2 to 5 per cent by weight of an inorganic reducing agent selected from the group consisting of ammonium sulfite, ammonium thiosulfate, sodium sulfite, sodium thiosulfate, potassium sulfite and potassium thiosulfate dissolved in the reaction mixture.

2. A process for making salicylamide which comprises reacting a lower alkyl ester of salicylic acid with ammonia at a temperature between 30° and 70° C. and at a superatmospheric pressure between 5 and 100 pounds per square inch while in admixture with from 0.5 to 1.5 parts by weight of water per part of the ester and from 0.2 to 5 per cent by weight of an inorganic reducing agent selected from the group consisting of ammonium sulfite, ammonium thiosulfate, sodium sulfite, sodium thiosulfate, potassium sulfite and potassium thiosulfate and thereafter separating salicylamide from the reaction mixture.

3. A process for making salicylamide, which comprises reacting methyl salicylate with ammonia at a temperature between 30° and 70° C. and at a superatmospheric pressure between 5 and 100 pounds per square inch while in admixture with from 0.5 to 1.5 parts by weight of water per part of the methyl salicylate and from 0.2 to 5 per cent by weight of a reducing agent selected from the group consisting of ammonium sulfite, ammonium thiosulfate, sodium sulfite, sodium thiosulfate, potassium sulfite and potassium thiosulfate and thereafter separating salicylamide from the reaction mixture.

4. A process for making salicylamide as claimed in claim 3 wherein the reducing agent is sodium sulfite.

5. A process for making salicylamide, which comprises reacting methyl salicylate with ammonia at a temperature between 30° and 70° C. and at a superatmospheric pressure between 5 and 100 pounds per square inch while in admixture with from 0.5 to 1.5 parts by weight of water per part of the methyl salicylate and from 0.2 to 5 per cent by weight of ammonium sulfite, and thereafter separating salicylamide from the reaction mixture.

6. A process for making salicylamide as claimed in claim 5 wherein the reaction is carried out at a superatmospheric pressure of from 10 to 30 pounds per square inch.

7. A process for making salicylamide as claimed in claim 6 wherein the reaction is carried out at a temperature between 35° and 60° C.

8. A process for making salicylamide, which comprises reacting methyl salicylate with ammonia at a temperature between 30° and 70° C. and at a superatmospheric pressure between 5 and 100 pounds per square inch while in admixture with from 0.5 to 1.5 parts by weight of water per part of the methyl salicylate and from 0.2 to 5 per cent by weight of sodium thiosulfate, and thereafter separating salicylamide from the reaction mixture.

WILLIAM R. SURINE.

REFERENCES CITED

The following references are of record in the file of this patent:

UNITED STATES PATENTS

| Number | Name | Date |
| --- | --- | --- |
| 2,463,462 | Huck | Mar. 1, 1949 |
| 2,478,114 | Lind et al. | Aug. 2, 1949 |

OTHER REFERENCES

Spilker, "Ber. Deut. Chem.," vol. 22, p. 2768 (1889).

Kline, "J. Chem. Ed.," vol. 19, p. 332, July 1942.